(12) United States Patent
Lecomte

(10) Patent No.: US 7,428,755 B2
(45) Date of Patent: Sep. 23, 2008

(54) DEVICE THAT IS USED FOR SECURE DIFFUSION CONTROLLED DISPLAY PRIVATE COPYING AND MANAGEMENT OF AND CONDITIONAL ACCESS TO MPEG-4-TYPE AUDIOVISUAL CONTENT RIGHTS

(75) Inventor: Daniel Lecomte, Paris (FR)

(73) Assignee: Medialive (FR)

( * ) Notice: Subject to any disclaimer, the term of this patent is extended or adjusted under 35 U.S.C. 154(b) by 742 days.

(21) Appl. No.: 10/502,672

(22) PCT Filed: Jan. 15, 2003

(86) PCT No.: PCT/FR03/00124

§ 371 (c)(1),
(2), (4) Date: Sep. 30, 2004

(87) PCT Pub. No.: WO03/065731

PCT Pub. Date: Aug. 7, 2003

(65) Prior Publication Data

US 2005/0084018 A1    Apr. 21, 2005

(30) Foreign Application Priority Data

Jan. 31, 2002    (FR) ................................. 02 01164

(51) Int. Cl.
*H04L 9/32*    (2006.01)

(52) U.S. Cl. ............................. 726/26; 726/27; 726/28

(58) Field of Classification Search ......... 380/200–204, 380/217; 713/176; 705/57–59; 382/100; 726/267–28, 26; 725/25, 29–31
See application file for complete search history.

(56) References Cited

U.S. PATENT DOCUMENTS

| 6,104,860 | A |  | 8/2000 | Lee et al. |
| 6,233,356 | B1 |  | 5/2001 | Haskell et al. |
| 6,810,131 | B2 | * | 10/2004 | Nakagawa et al. .......... 382/100 |
| 2001/0028725 | A1 |  | 10/2001 | Nakagawa et al. |
| 2001/0053222 | A1 |  | 12/2001 | Wakao et al. |

FOREIGN PATENT DOCUMENTS

| EP |  | 0 920 209 A1 | 6/1999 |
| EP |  | 1 014 724 A2 | 6/2000 |
| WO | WO 01/69354 A2 | 9/2001 |

* cited by examiner

*Primary Examiner*—Hosuk Song
(74) *Attorney, Agent, or Firm*—DLA Piper US LLP

(57) ABSTRACT

A method for distributing video sequences according to a nominal flow format that describes a multiplicity of audiovisual scenes, each scene including a multiplicity of hierarchized audiovisual objects and a descriptor of the hierarchy and of spatial and temporal relationships among the objects, each video object including at least one complete I-VOP digital plane, including generating a first modified flow having the format of a nominal flow and a second flow of any format including digital information required for reconstruction of modified planes by analyzing the flow of video sequences, separately transmitting the two flows generated from a server to destination equipment, and calculating on the destination equipment a synthesis of a flow of the nominal format as a function of the first and second flows.

36 Claims, 3 Drawing Sheets

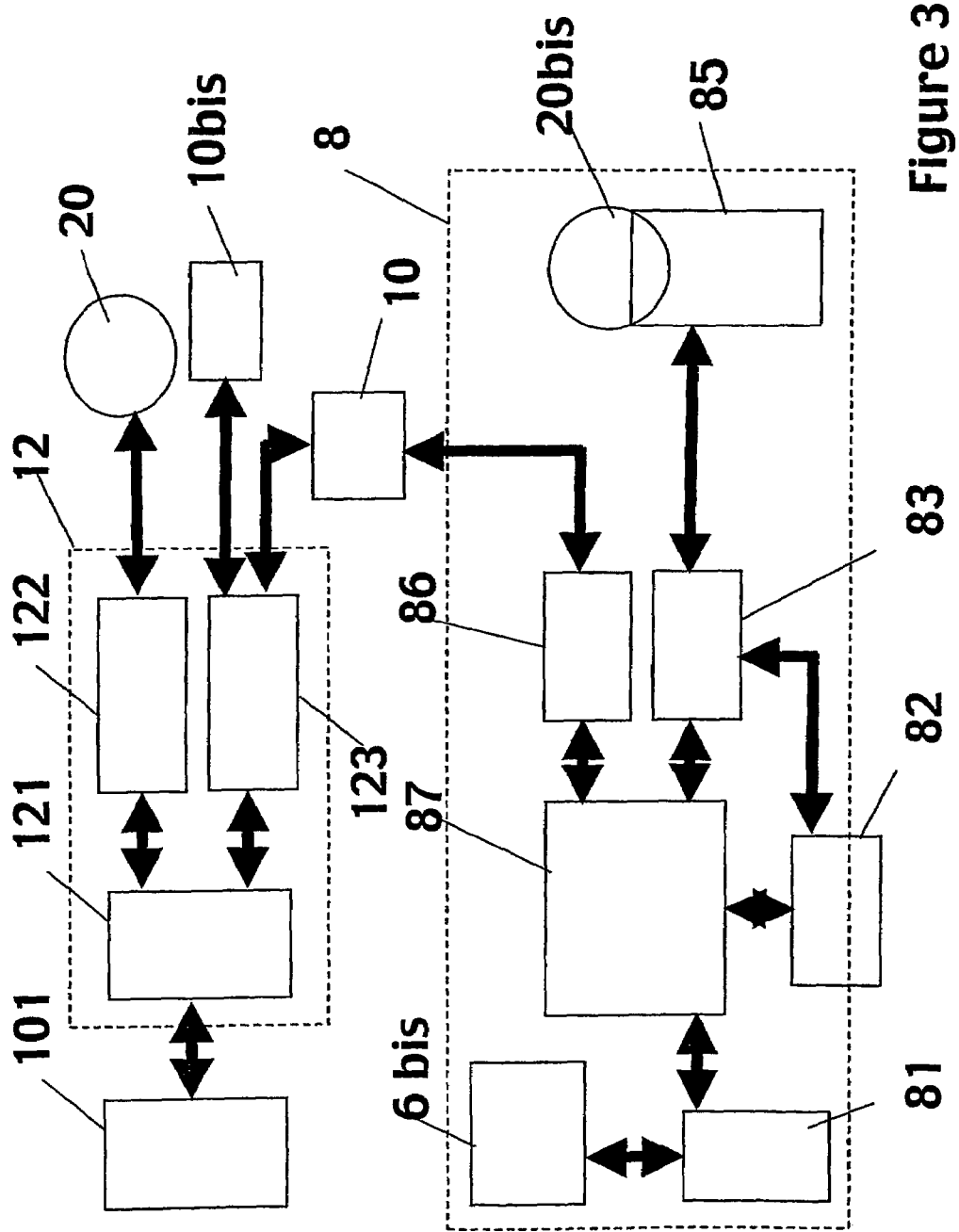

DEVICE THAT IS USED FOR SECURE DIFFUSION CONTROLLED DISPLAY PRIVATE COPYING AND MANAGEMENT OF AND CONDITIONAL ACCESS TO MPEG-4-TYPE AUDIOVISUAL CONTENT RIGHTS

RELATED APPLICATION

This is a §371 of International Application No. PCT/FR03/00124, with an international filing date of Jan. 15, 2003 (WO 03/065731, published Aug. 7, 2003), which is based on French Patent Application No. 02/01164, filed Jan. 31, 2002.

FIELD OF THE INVENTION

This invention pertains to the contingent access, secured broadcasting, control of recording, the private copying and the visualization of audiovisual data and television programs, or more generally any multimedia program or sequence using an MPEG-4 type nominal flow format, by authorized users and proposes a secured system for the processing, access, broadcasting, delivery, recording, private copying, visualization and management of the rights of interactive video or multimedia sequences.

BACKGROUND

The general problem is to provide a device capable of transmitting in a secured manner a set of films of high visual quality in an MPEG-4 form directly to a television screen and/or to be recorded on the hard disk of a box linking the remote transmission network to a monitor type screen or television screen, while preserving the audiovisual quality, but preventing fraudulent use such as the possibility of making "pirate" copies of films or audiovisual programs recorded on the hard disk of the decoder box.

With the presently available solutions, it is possible to transmit films and audiovisual programs in digital form via broadcasting networks of the airwaves, cable, satellite, etc. type or via telecommunication networks of the DSL (Digital Subscriber Line) or LRL (Local Radio Loop) type or via DAB networks (Digital Audio Broadcasting). Moreover, in order to prevent the pirating of the works broadcast in this manner, these works are often encrypted by various means known to the expert in the field.

However, the principal drawback of presently available solutions (TiVo Inc., WO 00/165762) is that it is necessary to transmit not only the encrypted data to the users, but also the decryption keys. Transmission of the decryption keys can be implemented before, at the same time as or after the transmission of the audiovisual programs. In order to increase the security and thus the protection of the audiovisual works against ill-intentioned use, the decryption keys as well as the decryption functions of the audiovisual decoders can comprise enhanced security means such as smart cards or other physical keys that can optionally be updated remotely.

Thus, the presently available solutions applied to a decoder box with the possibility of local recording of audiovisual programs in digital form on any kind of support of the hard disk or other type of memory provide the ill-intentioned user with the possibility of making unauthorized copies of the program recorded in this manner, since at a given moment the user possesses with a digital decoder box, optionally associated with smart card systems, all of the information, software programs and data enabling the complete decryption of the audiovisual programs. In fact, because the user has all of the data the ill-intentioned user would have the possibility of making illegal copies without anybody becoming aware of this fraudulent copy at the moment it is made.

One solution would therefore consist of transmitting all or part of a digital audiovisual program solely on demand (on demand video services) via a broad band telecommunication network of the ADSL, cable or satellite type, without authorizing the local recording of the audiovisual programs. WO 00/11871 (Open Entertainment) thus proposes a solution of distribution of multimedia files on request by the user. The drawback is completely different and stems from the performance of these networks which cannot ensure the continuous flow of multiple megabits per second to each user as is required by the MPEG-4 flows which require pass bands of several hundreds of kilobits to multiple megabits per second.

Under these conditions, one solution consists of separating the flow into two parts neither of which can be used on its own. Multiple patents have been filed in this context. WO 99/08428 (Gilles Maton) discloses a multiapplication processing method of a localizable active terminal in which there is implemented at least one link with an identifiable program dedicated to the execution of an application, the program dictating its conditions of exploitation to the terminal for making the functions available. The terminal dialogues punctually by the use of a link with the management center for the implementation, if necessary, of inputs and outputs of the center's capacity, the management center optionally becoming a slave of the terminal at the level of application of the incoming program. WO '428 also discloses a method for identification of the program and terminal in exploitation mode. That method divides the flow into a part serving to identify the user and a part that contains the program itself. In particular, the program is not unusable, but merely locked out by the first part.

In another direction, EP 0778513 (Matsushita) describes a method enabling the prevention of illegal use of an information unit by adding to it a control information unit in order to verify the user's rights. The system makes it possible to permanently know which part of the information unit is used and by which user and thus to know whether or not this user is in an illegal position. That method thus secures the data by adding to it additional information units which distort the initial information.

WO 00/49483 (Netquartz) also provides methods and systems for creating a link between the users and an editor of digitized entities. The method comprises at least one of the following steps: the step of subdividing the digitized entity into two parts; the step of storing one part in memory in a memory zone of a server connected to a computer-based network; the step of transmitting the other part to at least one user having available computer-based equipment; the step of connecting the computer-based equipment to the computer-based network; the step of establishing a functional link between the first part and the second part.

Finally, continuing this approach, U.S. Pat. No. 5,937,164 discloses a solution which consists of separating the flow into two parts, the smaller of which holds an information unit required for the use of the larger part. Nevertheless, that patent is not sufficient for responding to the identified problem. In fact, the suppression of a part of the flow distorts the format of the flow and therefore cannot be recognized as a standard flow that is exploitable with the general software applications. This method of the prior art requires both a specific software program at the server end, for the separation into two parts, and another specific software program to implement not only the reconstruction of the flow but also the acquisition of the principal flow and its exploitation according to a format proprietary to the solution. This proprietary form is not the initial format of the flow prior to its separation into two parts in this known solution.

U.S. Pat. No. 5,892,825 follows on the preceding patent, but in a less broad framework because the flows are always encrypted. U.S. Pat. No. 6,035,239 is based on the same principle and pertains to a method enabling the reading of a CD-ROM or DVD-ROM type disk contingent on the identification of the rights by the insertion of a smart card on which the information units necessary for reading are stored. That method is not sufficient because it does not ensure that the modified flow is of the same format as the original flow. U.S. Pat. No. 6,185,306 pertains to a method for the transmission of encrypted data from a Web site to a requestor computer. However, that method enables the user to have available at a given moment all of the tools required for copying the data.

U.S. Pat. No. 6,233,356 (Haskell Barin Geoffry et al.) discloses a scalability method of the MPEG-4 flows, i.e., the separation of the elements of the MPEG-4 video flow into multiple layers. The first layer, called the base layer, is required for reading the MPEG-4 flow and sufficient for reading it, but with a mediocre quality. The other layers make it possible to improve this quality, but will only be transmitted to the decoder if the transmission means allow it, i.e., if it is capable of transmitting, and the base layer and one or more supplementary layers.

EP 0 920 209 (Thomson Multimedia) discloses a method and a device for the scrambling of digital video data. EP '290 pertains to the change in the I images of an MPEG-2 flow of the DC and AC coefficients in order to protect the flow. The AC coefficients are permuted among each other in the same block by means of an exchange value which will be contained in the flow after the transformation has been implemented. The DC coefficients will be replaced by the coefficients of different values selected by means of a control value which will also be stored in the flow.

WO 01/69354 (Microsoft) discloses a system which protects a digital product (software or content) by breaking it down into at least two flows. This first flow is transmitted to the client's equipment by a physical medium such as a CD-ROM or a DVD. The second flow is transformed so as only to be exploitable by the client station in question, then it is transmitted by the same method or by a telecommunication network to this client station. The station receiving the two flows can modify the first flow as a function of a key transmitted by the server so that the first flow is compatible with the second flow received, and these two flows are recombined together in order to reconstitute a binary flow with substance equivalent to the original flow, but different in terms of configuration, and adequate for the client system. Thus this system ensures that the flow to be transmitted is good for the client device and that it can only be used by said device.

U.S. Pat. No. 6,104,860 (Goto Koicho et al.) discloses an access control system enabling the recording or not of television programs as a function of the authorization given to the user of this method, and validated by a key contained in a smart card. The transmitted television flow contains supplementary information units analyzed by the system and which validates or not the authorization to record. Once recorded, the flow can be replayed but it is again subjected to reading authorization via the access control.

"White Paper on the Secure Digital Music Initiative SDMI" (Rump N et al) discloses a system that consists of adding information to a flow in order to add data concerning the ownership of said flow.

SUMMARY OF THE INVENTION

This invention relates to a method for distributing video sequences according to a nominal flow format that describes a multiplicity of audiovisual scenes, each scene including a multiplicity of hierarchized audiovisual objects and a descriptor of the hierarchy and of spatial and temporal relationships among the objects, each video object including at least one complete I-VOP digital plane, including generating a first modified flow having the format of a nominal flow and a second flow of any format including digital information required for reconstruction of modified planes by analyzing the flow of video sequences, separately transmitting the two flows generated from a server to destination equipment, and calculating on the destination equipment a synthesis of a flow of the nominal format as a function of the first and second flows.

This invention also relates to the method wherein the VOP plane is broken into blocks and macroblocks each dependent on each other by correlation coefficients, the first modified flow having I-VOP planes modified by substitution of selected correlation coefficients by coefficients of the same nature, but random, and the second flow includes substituted correlation coefficients and the digital information needed to enable the reconstruction of the modified planes.

This invention further relates to an apparatus for creating a video flow including at least one multimedia server containing original video sequences and a device for analyzing the video flow originating from the server for generating the first and second flows.

This invention still further relates to an apparatus for exploiting a video flow including a computer which is part of a communication interface for receiving a video flow originating from a communication network or a physical support reader, and equipped with at least one recorder for storing the first flow, and a decoder including a display interface, communication means with the computer for receiving the first flow transmitted by the computer and communication means for receiving the second flow recomposing means for the original flow from the first and second flows.

This invention yet again relates to a system for transmitting a video flow including an equipment unit for production of a video flow, at least one equipment unit for exploitation of a video flow and at least one communication network between the production equipment unit and the exploitation equipment unit(s).

BRIEF DESCRIPTION OF THE DRAWINGS

Enhanced comprehension of the present invention will be obtained from the following nonlimitative example with reference to the attached drawings in which:

FIG. 3 represents one particular mode of implementation of the flow synthesis system in accordance with the invention.

DETAILED DESCRIPTION

Figure 1:
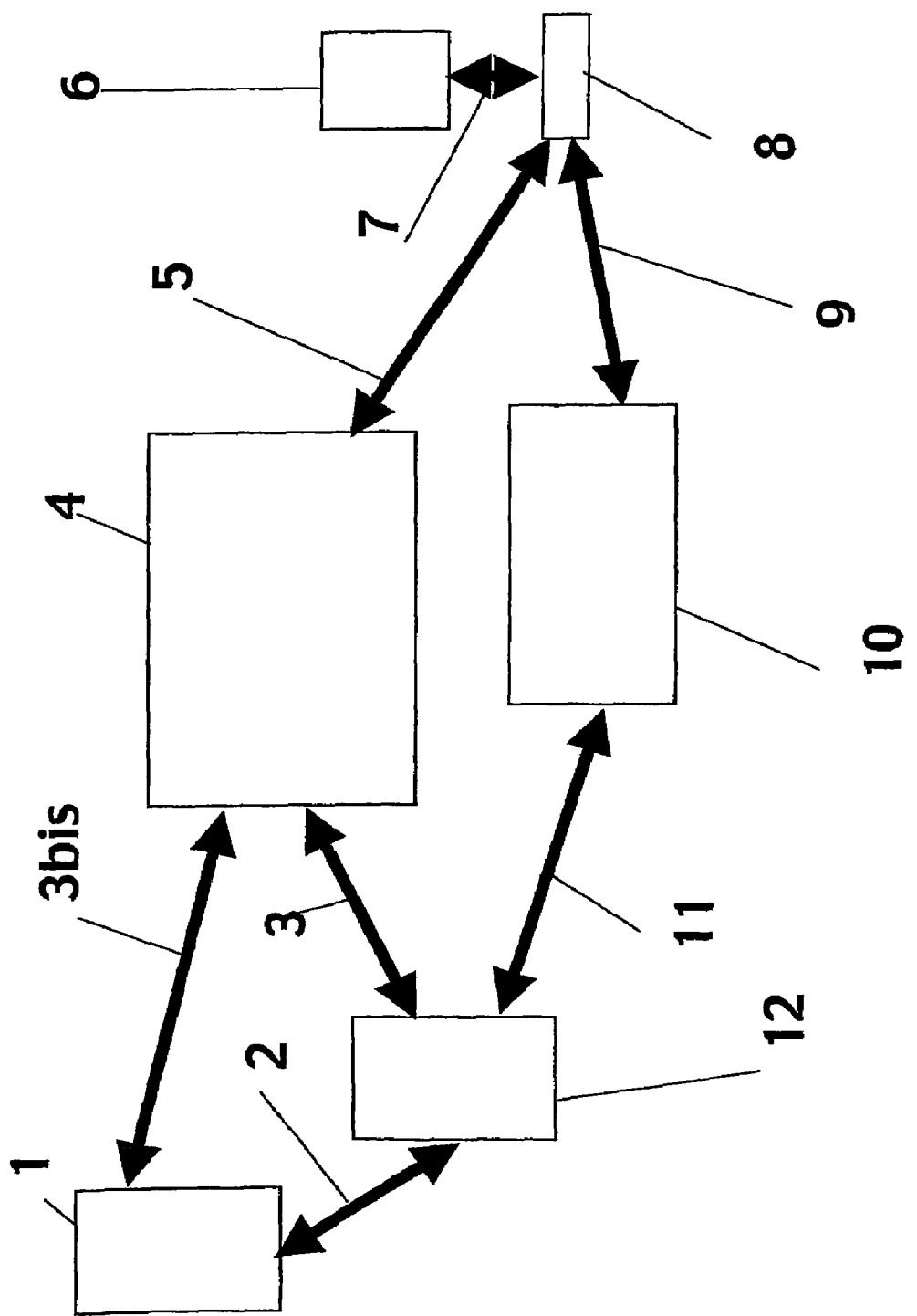
FIG. 1 is a diagram of the overall architecture of a system for the implementation of a system for the implementation of the method according to the invention.

This invention pertains to a method for the distribution of video sequences according to a nominal flow format constituted by data representing a succession of audiovisual scenes constituted by audiovisual objects hierarchized according to a script describing their spatial and temporal relationships each comprising at least one I-VOP plane corresponding to a complete object plane such as is the case with the MPEG-4 standard.

As is well known, the MPEG-4 standard introduces concepts of video objects (VO for "Video Object"), e.g., a person or car that passes. The MPEG-4 standard also introduces the video object plane (VOP) which represents a video object at a given moment and the video object layer (VOL). This decomposition into objects greatly facilitates interactivity and it becomes easier to obtain information on an object (the player or the car that passes).

The basic principle of MPEG-4 compression is based on the content. It is therefore necessary to separate the background from the animated objects. The characteristic of MPEG-4 is to clearly separate the objects and the background of a scene in order to later take advantage of this for the compression and supplementary functionalities that this lead to. This makes it possible, for example, in the case of a panoramic view to only transmit the complete background once and to transmit separately the animated objects.

An MPEG-4 coded audiovisual scene is described as a set of individualized and independent elements. It contains base components grouped together by type. These groups correspond to the branches of a cut-out tree in which each leaf represents a simple base element. Thus, an audiovisual scene of MPEG-4 type should be understood as the composition of audiovisual objects according to a script describing their spatial and temporal relationships. The MPEG-4 functionalities require a representation environment or an architecture which uses a different data structure than MPEG-1 or MPEG-2 because the significant parts of the visual information must be accessible for interaction and manipulation. In the text below, the term VOP (Video Object Plane) corresponds to a video component of arbitrary form. The VOP definition plane has the task of defining the significant objects of the scene with which independent interactions and manipulations will be possible. This means that these objects are represented in a manner to provide easy access preferably independent of the other objects of the scene. However, the different VOPs do not necessarily have the same spatial and temporal resolutions.

Moreover, in order to increase the manipulation possibilities, hierarchies of VOPs associated with different degrees of accessibility are also taken into account.

All of this enables the user to be able to interact with the objects of the scene. Here are several possible manipulations:

Modification of the spatial position of an object (VOP) in the scene;

Application of a spatial scale factor to an object of the scene;

Changing the speed with which an object moves in the scene;

Addition of objects;

Suppression of an object from the scene.

In the MPEG-4 standard, the information units relative to the form, movement and texture of the VOPs are coded in separate VOL (Video Object Layer) layers so as to enable separate decoding of the VOPs. With MPEG-4, the rectangular image is merely one particular case of coding of multiple VOPs as an image of arbitrary form.

MPEG-4 VM (MPEG-4 Video Verification Model) uses an identical algorithm for coding information relative to the form, movement and texture in each layer. However, the information pertaining to the form is not transmitted if the sequence to be coded does not contain standard images of rectangular size. In this case, the MPEG-4 video coding algorithm has a structure similar to the MPEG-1 and MPEG-2 algorithms. This is suitable for applications that require a high degree of coding efficacy without requiring extended functionalities based on the content.

The MPEG-4 compression algorithm is based on the hybrid technique of the DPCM/Transform already employed by the MPEG-1 and MPEG-2 standards.

The first VOP is coded in I-VOP mode. Each of the following images is coded using the inter-image prediction (P-VOP). Only the data for the closest previously coded image are used for the prediction. To this is added the support of the B-VOPs. The coding method is the same as that of the standard MPEG-1 and MPEG-2.

The incoming images that must be coded for each VOP layer are generally of arbitrary form and the position and form of the images vary over time with respect to a reference window. MPEG-4 VM thus introduces the concept of VOP reference window with a macroblock grid adaptable to the form. All of the VOL layers that must be coded for an incoming video sequence are defined with reference to the reference window whose size is constant.

The information in the form of a VOP is coded prior to the coding of the position vectors based on the macroblock grid of the VOP and is exploitable not only for encoding but also for decoding. In the subsequent steps of the process, only the information pertaining to the movement and texture of the blocks of the macroblock are coded (which comprises the standard macroblocks and the contour macroblocks).

In its broadest sense, the invention pertains to a method for the distribution of video sequences according to a nominal flow format intended to describe a multiplicity of audiovisual scenes, each scene being constituted of a multiplicity of hierarchized audiovisual objects and a descriptor of the hierarchy and of the spatial and temporal relationships among the objects, each video object comprising at least one complete I-VOP digital plane, characterized in that there is performed prior to the transmission to the client equipment, an analysis of the flow in order to generate one first modified flow having the format of a nominal flow and a second flow of any format comprising the digital information required for the reconstruction of the modified planes, then of transmitting separately the two flows generated in this manner from the server to the destination equipment, and in that there is calculated on the destination equipment a synthesis of a flow of the nominal format as a function of the first flow and the second flow.

The synthesis advantageously produces a flow rigorously identical to the original flow, i.e. the method is without loss.

In one particular mode of implementation of this method, each video object comprises at least one N-VOP plane of the data representing the plane being calculated as a function of the differences between the N-VOP plane and at least one other plane.

The first flow advantageously has modified N-VOP planes.

According to one mode of implementation of this method, the data of at least one N-VOP plane are calculated by movement compensation of the N-VOP plane in relation to the preceding N-VOP or I-VOP plane. The N-VOP plane is then referred to as P-VOP plane (predicted).

According to another mode of implementation of this method, the data of at least one N-VOP plane are calculated by movement compensation of the N-VOP plane in relation to the preceding and following P-VOP and I-VOP planes. The N-VOP plane is then referred to as B-VOP plane (bidirectional).

The format of the nominal flow is advantageously defined by the MPEG-4 standard.

In one mode of implementation of this method, the first flow presents modified P-VOP planes.

In another mode of implementation of this method, the first flow presents modified B-VOP planes.

The I-VOP plane is advantageously broken down into blocks and macroblocks which are dependent on each other by correlation coefficients and the first modified flow has I-VOP planes modified by the substitution of certain correlation coefficients by coefficients of the same nature, but random, and that the second flow comprises the substituted correlation coefficients and the digital information required for the reconstruction of the modified planes.

The analysis advantageously determines the correlation coefficients to be modified as a function of the desired size for the second flow and the desired degradation for the first modified flow. These modifications can be: replace the correlation coefficients of an I-VOP plane with the correlation coefficients of another I-VOP plane, invert two correlation coefficients of the same I-VOP plane, invert two correlation coefficients of two I-VOP planes of the same flow, replace the correlation coefficients of an I-VOP plane by random values.

According to one particular implementation of this method, at least one P-VOP plane is modified in the same manner as the I-VOP planes.

The analysis advantageously determines the I-VOP, P-VOP and B-VOP planes to be modified as a function of the size desired for the second flow and the level of degradation desired for the first modified flow. These modifications can be: modifications of the correlation coefficients of the I-VOP or P-VOP planes, replacement of a P-VOP plane by another P-VOP plane of another flow, inversion of two P-VOP planes of the same flow, inversion of a B-VOP plane and a P-VOP plane of the same flow.

If there are B-VOP and P-VOP planes, an N-VOP plane is necessarily of the B-VOP or P-VOP type.

In one particular implementation of this method, the transmission of the first flow is implemented via a material support distributed physically such as, e.g., a CD-ROM, DVD, hard disk or flash memory card.

In another implementation of this method, the transmission of the first flow is implemented via a broad-band network (cable, satellite, optical fiber, airwaves, DSL, DAB).

According to the implementation of this method, the transmission of the second flow is implemented via a cable network, via a switched telephonic network (analog or digital PSTN), via a mobile telephone network using the GSM, GPRS or UMTS standards, via a LRL network (local radio loop) or via a DSL network.

According to one particular variant of this method, the transmission of the second flow is implemented via a broad-band network of the same type as the network used for the first flow, or in fact via the same network.

According to one particular variant of this method, the transmission of the second flow is implemented by means of a flash memory card or by means of a smart card.

The transmission of one or both of the two flows is advantageously encrypted.

One or both of the two flows is advantageously watermarked using conventional watermarking techniques.

According to one mode of implementation of this method, the two generated flows can be sent to a single equipment unit, a group of equipment units or to all of the equipment units.

According to one particular mode of implementation, the reconstruction is contingent on a transaction.

The reconstruction can also be authorized by a consultation of a private copy requested by the client.

Generally speaking, the fact that the reconstruction is contingent on the authorization of the portal allows any operator of the service to manage all of the rights attached to the audiovisual works.

The invention moreover pertains to an equipment unit for the creation of a video flow for the implementation of this method comprising at least one multimedia server containing the original video sequences and characterized in that it comprises a device for analysis of the video flow originating from the server in order to generate the two flows.

This equipment advantageously comprises a memory for recording a "private copy" marker indicating for each sequence the rights of each user: private copy that can be watched an unlimited number of times, private copy that can be watched a limited number of times and specification of that number, private copying prohibited.

The invention moreover pertains to an equipment unit for the exploitation of a video flow for the implementation of this method comprising a standard flow decoder, at least one recording interface (hard disk, flash memory) for storing the content of said first flow and/or a disk reader (CD, DVD, etc.) and at least one display interface (standard screen, wireless screen, video projector), characterized in that it comprises a means for the recomposition of the original flow from the two flows.

According to one particular mode of implementation, the means is a software program application installed on the equipment unit.

According to another mode of implementation, the means is a fixed electronic device.

According to another mode of implementation, the means is a portable (mobile) electronic device with an incorporated screen.

According to one mode of implementation in which the equipment is installed on a computer, the means uses a resource specific to the product (card) in order to prevent the copying of the temporary information of the second flow on a permanent support.

The recording interface advantageously also stores a "private copy" marker in relation to the first flow indicating the user's rights for this sequence: private copy that can be watched an unlimited number of times, private copy that can be watched a limited number of times with specification of this number, and private copying prohibited.

According to another mode of implementation, the means is a fixed electronic device.

According to another mode of implementation the means is a portable (mobile) electronic device with an incorporated screen.

According to one mode of implementation in which the equipment is installed on a computer the means uses a resource specific to the product (card) in order to prevent the copying of the temporary information of the second flow on a permanent support.

The recording interface advantageously also stores a "private copy" marker in relation to the first flow indicating the user's rights for this sequence: private copy that can be watched an unlimited number of times, private copy that can be watched a limited number of times with specification of this number, and private copying prohibited.

The equipment advantageously comprises a smart card reader for identifying the user.

The equipment advantageously comprises a smart card reader, with the smart card containing the software applications.

The equipment advantageously comprises a smart card reader, with the smart card containing the second flow for a given content.

One variant of implementation consists of making the client equipment in the form of two means interconnected by a physical link or a remote link (Bluetooth, AirPort, WIFI, infrared, etc.). According to this variant, the equipment for the exploitation of a video flow comprises a first means constituted of a personal computer of a communication interface for receiving a video flow stemming from a communication network or a physical support reader, and equipped with at least one recording means (hard disk) intended to store the content of the first flow, and a second means constituted of a decoder, comprising a display interface, means for communication with the principal computer for receiving the first flow transmitted by the computer and communication means for receiving the second flow, as well as a means for the recomposition of the original flow from the two flows.

According to a first mode of implementation, the means for the recomposition of the flow is a software application installed solely on the decoder.

According to a second mode of implementation, the means for the recomposition of the flow is an electronic device installed solely on the decoder.

The invention lastly pertains to a system for the transmission of a video flow, characterized in that it comprises an equipment unit for the creation of a video flow, at least one equipment unit for the exploitation of a video flow and at least one communication network between the production equipment and the exploitation equipment unit(s).

The invention pertains to a data flow in a nominal format especially, but not exclusively an MPEG-4 type flow. The form of the audiovisual flow used must have the following characteristics:

This format must break down the data into frames, each frame comprising one complete I-VOP plane and at least one P-VOP plane calculated by coding the differences (movement compensation) between this plane and the preceding I-VOP or P-VOP plane; and Each frame optionally comprises at least one B-VOP plane calculated by coding the differences (movement compensation) between this plane and the preceding or following I-VOP and/or P-VOP planes.

The invention pertains to a data flow of nominal format, especially, but not exclusively an MPEG-4 type flow. The format of the audiovisual flow employed must have the following characteristics:

this format must break down the data into frames, each frame comprising one complete I-VOP plane; and each I-VOP plane contains correlation coefficients between the different blocks and/or macroblocks of the I-VOP planes.

In the description below, the example pertains to an MPEG-4 flow without thereby constituting a limitation on the scope of protection.

The general principle of a method for making a video flow secure is presented below. The objective is to authorize video on demand and card-paid video services via all of these broadcast networks and the local recording in the user's digital decoder box. The solution consists of preserving permanently outside of the user's habitation, in the broadcast and transmission network, a part of the recorded audiovisual program, this part being essential for displaying the audiovisual program on a television screen or other type of monitor, but of a very small volume in relation to the total volume of the digital audiovisual program recorded by the user. This missing part will be transmitted to the transmission broadcasting network at the moment of visualization of the previously recorded digital audiovisual program by the user.

The larger part of the audiovisual flow will thus be transmitted via a conventional broadcast network while the missing part will be transmitted on demand via a narrow band telecommunication network such as the conventional telephone networks or cellular networks of the GSM, GPRS or UMTS type or using a small part of a network of the DSL or LRL type, or by using a subset of the shared pass band on a cable network.

In FIG. 1, the setup of the video interface (8) is adapted to link at least one display device, e.g., a monitor, a video projector or a television screen type device (6), to at least one broad-band transmission and broadcasting network interface (4) and at least one telecommunication network interface (10). This setup is composed of a module (8) comprising principally on the one hand a processing unit for processing, in particular decoding and unscrambling, any MPEG-4 type video flow according to a preloaded decoding and unscrambling software program in a manner so as to display in real time or on a delayed basis, to store, to record and/or to transmit on a telecommunication network and, on the other hand, at least one screen interface (7) and an interface for connection to a local or extended network (5) and/or (9). The broad band transmission and broadcasting network (4) and the telecommunication network (10) can be merged into a single network.

The hard disk of the module (8) can be used as buffer memory for momentarily storing at least a part of the video program or sequence to be displayed, in the case of delayed visualization or of limitation in the pass band of the transmission network. The visualization can be delayed or deferred at the request of the user or the portal (12).

As shown in FIG. 1, the connection interface (5) is linked to a broad-band transmission and broadcasting network (4) such as a modem, a satellite modem, a cable modem, an optical fiber line interface or a radio or infrared interface for wireless communication.

It is by means of this conventional video broadcast link that the contents of the audiovisual programs such as films will be transmitted. However, in order to not allow pirate copies to be made before transmitting the audiovisual content from the server (1) or the portal (12) it is provided to hold back a small part of the audiovisual content in the portal (12).

In the case of visualization of an audiovisual program in real time, this small part of the audiovisual content preserved in the portal (12) will also be transmitted to the module (8) via the telecommunication network (10).

Since the successive planes of a video sequence contain a large number of identical visual elements (as in cinema, an image resembles the preceding image), MPEG-4 only records the elements that differ from the original plane. Thus an entire reference plane will be modified by preserving the modifications brought to the coefficients in the portal (12) and, for the successive planes which are dependent on this I-VOP reference plane, it not necessary to bring the modifications because they will cause divergence of the visualized flow because of the disturbances brought to the I-VOP reference planes.

The MPEG-4 compression thus commences initially by breaking down the image into different square matrices comprising multiple points or pixels, each one having its own calorimetric value. A calculation provides a mean value for each matrix within which is now embedded each point. This processing generates a pixilation and the appearance of uniform flat tints where there existed tint nuances. The second stop of the MPEG-4 compression consists of preserving from one plane to another only the changing elements.

In order to obtain animated images of the MPEG-4 type, the principle consists of capturing several images in time, the intermediary images being calculated from these. The analysis of the complete reference planes (called I-VOP for Intra) makes it possible to predict the intermediary P-VOP planes (Predicted). Then the B-VOP planes (Bidirectional) are intercalated between reference planes and predicted planes.

The video is represented as a succession of individual planes each of which is processed as a two-dimensional matrix of image elements (pixels). The representation of the colors of each pixel comprises three components: a luminance component Y and two chrominance components Cb and Cr.

The compression of the digitized video is implemented by multiple techniques: subsampling of chrominance information to adapt to the sensitivity of the human visual system (HVS), quantification, movement compensation (MC) to exploit temporal redundancy, transformation in the frequency domain by discrete cosine transformation (DCT) to exploit the spatial redundancy, variable length coding (VLC) and image interpolation.

Since the human visual system (HVS) is most sensitive to the resolution of the luminance component of an image, the Y pixel values are coded at full resolution. The human visual system is less sensitive to chrominance information. Subsampling eliminates the values of pixels based systematically on position which reduces the amount of information to be compressed by other techniques. The standard preserves a set of chrominance pixels for each 2×2 neighborhood of luminance pixels.

The base coding unit of an image is the macroblock. The macroblocks of each image are coded successively from left to right and from top to bottom. Each macroblock is composed of six 8×8 blocks: four luminance blocks, one Cb chrominance block and one Cr chrominance block. It should be noted that the four luminance blocks cover the same zone of the image as each of the chrominance blocks because of the subsampling of the chrominance information performed to adapt the coding to the sensitivity of the human visual system.

For a given macroblock, the first operation is the selection of the coding mode which is dependent on the type of image, the efficacy of the compensated movement prediction in the coded region and the nature of the signal contained in the block. Secondly, a compensated movement prediction of the content of the block, based on the prior or future reference images, is formed. This prediction is subtracted from the real data of the current macroblock in order to form an error signal. Thirdly, this error signal is divided into six 8×8 blocks (4 luminance blocks and 2 chrominance blocks in each macroblock) to each of which is applied a discrete cosine transformation. The resultant 8×8 block of DCT coefficients is quantified. The resultant two-dimensional block is scanned in a zigzag manner to be converted into a one-dimensional chain of quantified DCT coefficients. Fourthly, the annexed information of the macroblock (type, vectors, etc.) as well as the data of the quantified coefficients are coded. In order to attain a maximal efficacy, a certain number of variable length coding tables are defined for the different data elements. A coding of the field lengths is applied to the quantified coefficients data.

The DCT coefficient of the upper left point (0,0) of the block represents a zero horizontal and vertical frequency: it is referred to as DC coefficient (continuous). Since the DC coefficient is proportional to the mean value of the pixels of the 8×8 block, the predictive coding enables a supplementary compression because the difference in the mean values of the neighboring 8×8 blocks tends to be relatively small. The other coefficients represent one or more nonzero horizontal and/or vertical spatial frequencies and are referred to as AC coefficients. In order that the level of quantification of the coefficients corresponding to the high spatial frequencies favor the creation of a zero coefficient, one selects a quantification pitch such that the human visual system (HVS) is unlikely to perceive the loss of spatial frequency in question, unless the value of the coefficient is above this quantification level. The statistical coding of the predicted coefficient fields of high consecutive order of zero value contributes considerably to the compression gain. In order to group together the nonzero coefficients at the beginning of the series and to code as many zero coefficients as possible following the last nonzero coefficient, their sequence is given by a zigzag scanning which concentrates their high spatial frequencies at the end of the series.

Variable length coding (VLC) is a statistical coding technique which assigns the code words to the values to be coded. Short code words are assigned to frequency values with a high level of occurrence and long code words are assigned to those with a low level of frequency. More frequent short code words are on average predominant such that the coded chain is shorter than the original data.

The invention consists of using the correlation between the DC and/or AC coefficients in an I-VOP plane in order to be able to manipulate the visual appearance and validity of the sequence to which belongs the I-VOP plane in question.

In the subsequent text, the manipulations brought to the DC coefficients can also be brought to the AC coefficients without it being necessary to provide specifications in greater detail.

In fact, given that the I-VOP planes are the principal carriers of information in an MPEG-4 sequence, all important modifications affecting these I-VOP planes will necessarily have an impact on the validity of the sequence.

Thus, the possibility of obtaining noteworthy degradations of the I-VOP planes without effecting complicated manipulations is offered by the correlation between the DC coefficients in this I-VOP plane. These coefficients, being highly dependent on each other, determine to a great extent the value of the following coefficients of the same type. It is thus that by modifying the information contained therein that one modifies profoundly the I-VOP planes and as a consequence the entire MPEG-4 sequence that follow this I-VOP plane.

Each macroblock of an I-VOP plane contains six blocks, each of which commences with a DC coefficient. Four blocks correspond to the luminance (Y) and two blocks correspond to the chrominance (C) of the macroblock. The value written in a file of the MPEG-4 flow representing a DC coefficient is in effect the difference between the real value of this coefficient and that of the corresponding coefficient which precedes it and which, for the Y blocks, can be found in the same macroblock or in the preceding macroblock whereas for the C blocks it is always in the preceding macroblock. A modification of one of these differences will automatically lead to a modification of the information in all of the subsequent macroblocks.

When it reads the binary train, a conventional MPEG-4 decoder identifies the beginning of a coded plane, then the type of plane. In order to prevent any confusion with a standard decoder box often referred to as a "Set Top Box or STB", the standard MPEG-4 decoder will be referred to as "Reader" ("Player" or "Viewer") in the continuation of this document. This Reader can be implemented in hardware and/or software form. The MPEG-4 reader decodes successively each macroblock of the plane. The plane is reconstructed when all of these macroblocks have been processed. In the case of an I-VOP plane, it constitutes a reference plane for the subsequent planes and it is stored in the place of the oldest reference plane. The planes are thus available in digital form for post-processing and display in accordance with the application.

In the case of an MPEG-4 type audiovisual program, not all of the characteristics of the I-VOP planes originating from the server (1) or portal (12) are transmitted to the module (8). In particular, the characteristics in accordance with the invention are the DC correlation coefficients contained in the I-VOP planes.

Certain DC coefficients of these I-VOP planes are preserved in the portal (12). In contrast, in place of the DC coefficients of these untransmitted I-VOP planes, the device according to the invention will intercalate false DC coefficients of the same nature as the DC coefficients taken and preserved in the portal (12) such that the standard MPEG-4 Reader of the module (8) is not disturbed by these modifications that it will be unaware of and will reconstitute in the outgoing stream an output MPEG-4 flow which will be incorrect from the visual point of view for a human being but correct from the MPEG-4 format point of view.

The MPEG-4 Reader of the box (8) is a standard MPEG-4 Reader and has not been in any way modified or affected by the changes brought to the I-VOP planes.

Moreover, in the case of an MPEG-4 type audiovisual program, it is provided to not transmit all of the B-VOP and/or P-VOP planes originating from the server (1) or portal (12) to the module (8). These B-VOP and/or P-VOP planes are stored in the portal (12). In contrast, in place of the untransmitted B-VOP and/or P-VOP planes, the device according to the invention will intercalate false B-VOP and/or P-VOP planes of the same nature as the I-VOP and/or P-VOP taken, substituted and preserved in the portal (12) such that the MPEG-4 Reader of the module (8) is not disturbed by these modifications of which it is unaware and it will reconstitute on an outgoing basis an MPEG-4 output flow which will be incorrect from the visual point of view for a human being but correct from the MPEG-4 format point of view.

The MPEG-4 Reader of the box (8) is a standard MPEG-4 Reader and has not in any manner been modified or affected by the changes brought to the B-VOP and/or P-VOP planes.

According to one particular mode of implementation, in order to increase the efficacy of the protection system, it is preferable to not transmit the B-VOP and/or P-VOP planes which are the closest and which follow the I-VOP planes of the MPEG-4 flow. For an even greater efficacy, after analysis of their volume and their weight in octets or in bits, the B-VOP and/or P-VOP planes will be selected to not be transmitted but preserved in the portal (12).

According to one particular mode of implementation, certain P-VOP and/or B-VOP planes will be permuted with each other.

As shown in FIG. 1, the connection interface (9) is linked to an extended telecommunication network (10) directly or via a local network functioning as an access network and is constituted, for example, of a subscriber line interface (analog or digital telephone network, DSL, LRL, GSM, GPRS, UMTS, etc.).

Thus the audiovisual programs are broadcast in a conventional manner in broadcast mode via the broad band transmission network (4) of the airwaves, cable satellite, digital airwaves, LRL, etc. type directly from the server (1) via the link (3 bis) or via the portal (12) via the link (2) and (3) to the decoder module (8) by means of the link (5). Each audiovisual program broadcast in this manner can be optionally encrypted and, in accordance with the present invention, the MPEG-4 flows will comprise modifications at the level of certain I-VOP planes as described above. As a function of the parameters selected by the user or of information transmitted by the broadcast server, certain audiovisual programs modified in this manner and incomplete are recorded on the hard disk of the box (8).

When the user wants to watch an audiovisual program recorded in this manner on the hard disk of decoder module (8), the user implements the request in the conventional manner via the remote control linked to the decoder module (8) which then connects automatically to the portal (12) via the link (9) of the local network or direct access type and via the telecommunication network (10) itself linked to the portal (12) via the connection (11). During the entire visualization of the audiovisual program, the links (9) and (11) remain established and enable the decoder module (8) to receive the functions and parameters of restoration of the modified DC coefficients of the I-VOP planes. The modified DC coefficients of the I-VOP planes transmitted in this manner are never recorded on the hard disk of the decoder module (8) because the reconstituted I-VOP planes are directly displayed on the visualization screen (6) via the link (7) after having been processed by the Reader of the decoder module (8) from its local volatile memory. After having been processed and visualized, the modified and/or missing DC coefficients of the I-VOP planes that have been transmitted by the portal (12) will be erased from the local volatile memory of the decoder module (8).

According to one particular mode of implementation, the modified DC coefficients of the I-VOP planes broadcast in this manner can be optionally encrypted by any presently existing or future encryption means. The same is true for the algorithms, functions and restoration of order of the modified DC coefficients of the I-VOP planes.

Each time that the user wants to watch a program recorded on the hard disk of the decoder module (8), the decoder module (8) is connected automatically to the portal (12). Similarly when the user implements a pause, the transmission of modified DC coefficients of the I-VOP planes originating from the portal (12) will be interrupted until the restarting of the visualization, thereby ensuring that not all of the information of an audiovisual program will be found in the decoder module (8) at a given moment and thereby preventing ill-intentioned people from making pirate copies of these recordings.

According to one particular mode of implementation, the decoder module (8) comprises a smart card reader which enables the portal (12) to authenticate the user/owner of the decoder module (8).

According to one particular mode of implementation, for a given MPEG-4 content, the smart card contains said second flow which was stored in memory by the portal (12).

If this is authorized, the smart card also allows the user to create private copies of the audiovisual programs recorded on the hard disk of the decoder module (8). In order to implement this, if the user wants to make a private copy of an audiovisual program, he will do it in the conventional manner on a VCR via the link (7) which connects the module (8) to the display screen (6).

However, if he wants to save a private copy on the hard disk of his box, he will so inform the module (8) which will record the "private copy" information unit as well as the user's coordinates from the smart card in a particular field (84) of this audiovisual program recorded on the hard disk (85) of the decoder module (8). Subsequently, each time that the user wants to watch this private copy, the module (8) will automatically connect to the portal (12) and inform the portal that the user wants to read his private copy; in response, if the reading of the private copy is possible for this user which possesses this smart card linked to this decoder module (8), the decoder module (8) will then receive the modified and/or missing DC coefficients of the I-VOP planes as well as all the other information enabling the visualization of the audiovisual program constituting the private copy.

According to another mode of implementation, if the user wants to save a private copy on the hard disk of his box, he will so inform the server which will record the information unit "private copy" for this program in the private copy memory (124) of the portal (12) and for this user authenticated by the smart card. Subsequently, each time that the user wants to watch this private copy, the decoder module (8) will connect automatically to the portal (12) and inform the portal that the user wants to read his private copy. In response, if the reading of the private copy is possible for this user which possesses this smart card and for this program, the decoder module (8) will then receive the missing DC coefficients of the I-VOP planes as well as all of the other information enabling visualization of the audiovisual program constituting the private copy.

According to one particular mode of implementation, the so-called "private copy" could allow the user to watch this audiovisual program in an unlimited manner or in a number of times determined in advance by the service provider which authorized this private copy.

The invention also pertains to the decoder module (8) used by the consumer for accessing the data. This physical box is located in the user's domicile. It provides a set of functionalities which manage the information suitable for presentation according to the selection of the audience and manages the connection and communication with the remote server.

According to one particular mode of implementation, the physical box corresponding to the video interface setup is implemented by means of a fixed autonomous device with integrated hard disk.

According to one particular mode of implementation the physical box corresponding to the video interface setup is implemented as a portable (mobile) autonomous device with integrated hard disk and/or disk reader (CD, DVD, etc.).

According to one particular mode of implementation the autonomous physical box comprises a smart card reader.

According to another particular mode of implementation the video interface setup is implemented as an add-on card which will be installed in a PC and will be linked to at least one broad band transmission and broadcasting network interface (4) and to at least one telecommunication network interface (10). This card will use the hard disk of the PC for recording the first flow but will have its own calculator and volatile memory so as to not allow the ill-intentioned PC user the means to access the complementary information such as the modified PC coefficients of the I-VOP planes of the second flow.

According to the present invention, the video and multimedia servers (1) and/or (12) comprise means for coding, transcoding and scrambling video data, particularly means for adding cryptographic and security information units at the beginning and all along the sequences.

Finally, it should be noted that the invention degrades the MPEG-4 flow from the visual point of view to the point of not allowing recognition of the transmitted and displayed scenes if there is no access to the complementary data and characteristics, but completely reconstitutes the M-PEG4 flow in the video interface setup without any loss.

Although the present invention is most particularly focused on audiovisual data, it is understood that all interactive multimedia information and all interactive data can be processed by the present setup and the present system, the MPEG-4 type video data being the most elaborated.

Figure 2:
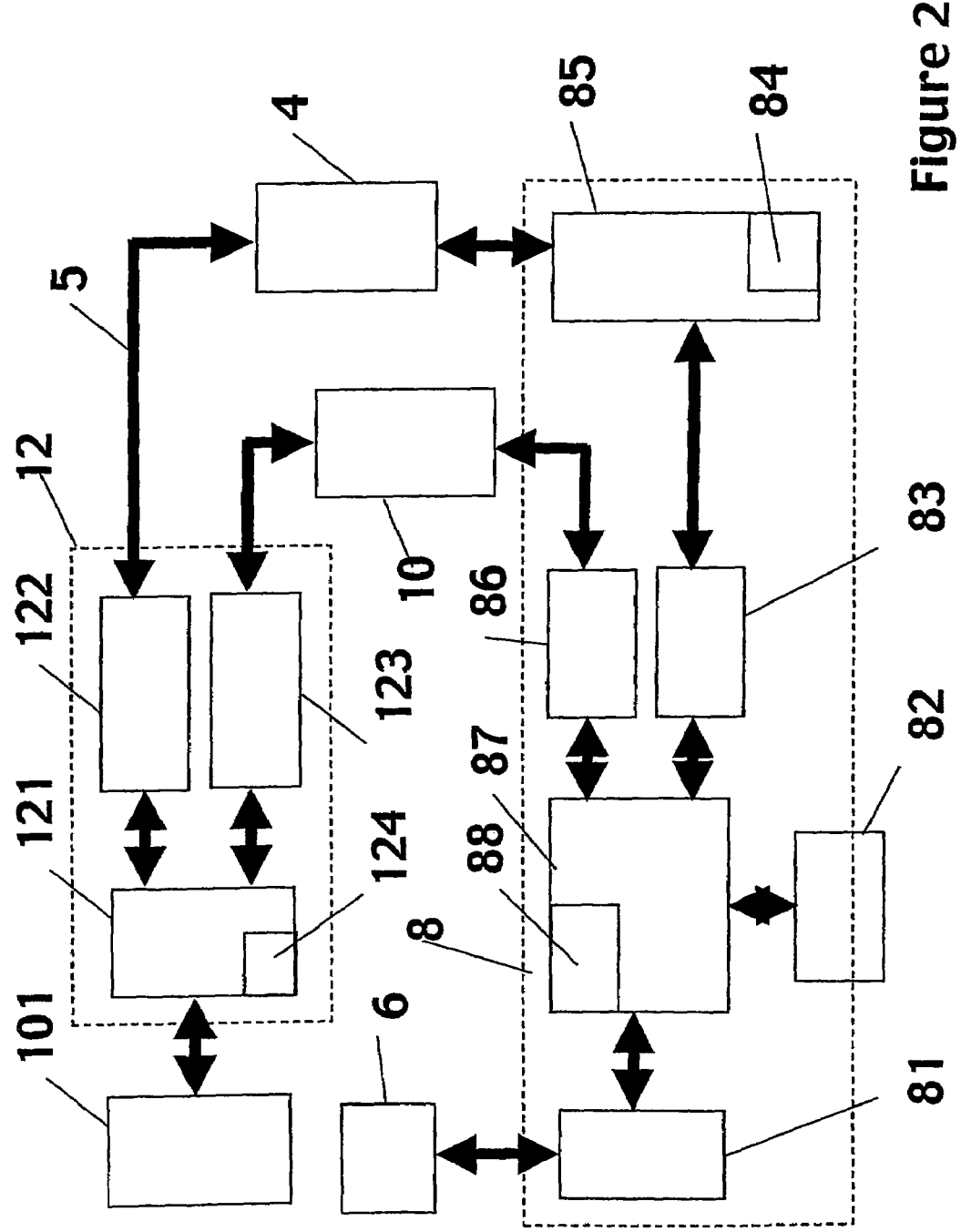
FIG. 2 represents one particular mode of implementation of the analysis and flow synthesis system in accordance with the invention.

Better comprehension of the invention will be obtained from the description below which presents the physical basis of the invention with reference to FIG. 2 of the attached drawings representing a preferred mode of implementation of the invention as a nonlimitative example of implementation particularly suitable for cable and satellite networks. The complete MPEG-4 flow (101) is analyzed by the analysis device (121) of the portal (12) and will thus be separated into an MPEG-4 type flows but whose missing DC coefficients of the I-VOP planes will have been processed and transmitted via the output (122) of the portal via the broad band broadcast transmission network (4).

The other part of the modified MPEG-4 flow will be stored in memory in the buffer memory (122) of the portal (12). For each MPEG-4 flow broadcast in this manner, the portal (12) will store in a buffer memory (122) the modifications which had been implemented on this MPEG-4 flow by the analyzer (121) of the portal (12). It should be indicated that for the same incoming MPEG-4 flow (101), the processing of the flow can be different for each decoder module/user (8) and/or for each group of decoder modules/users (8). The buffer memory (123) of the portal (12) therefore has a different memory zone for each user.

In the implemented examples, for a first user, the DC coefficients of certain I-VOP planes of the MPEG-4 flow are modified. For a second user, certain coefficients of the I-VOP planes and certain P-VOP planes of the MPEG-4 are modified. For a third user, certain P-VOP planes and certain B-VOP planes of the MPEG-4 flow are substituted, modified and/or exchanged; in the fourth example, the decoder module (8) is portable (mobile).

We will now described in detail the different steps for the first user.

The portal (121) selected the MPEG-4 flow (101) that it must send to the decoder module/user (8) 50 that the user can watch it on a delayed basis on television screen (6). This user is linked to a digital cable broadcasting network (4) and an ADSL telecommunication network (10).

The analysis system (121) of the portal (12) will thus read the incoming MPEG-4 flow (101) and each time it detects an I-VOP plane, it will break it down into macroblocks (thus into slices), then into blocks. This analysis allows it to recognize in the code the DC coefficients and to substitute certain among them with random values in order to render the planes (and by consequence the sequence) unreadable from the human vision point of view. The true values of the DC coefficients will be stored in the output buffer (123) which will subsequently enable the reconstitution of the original sequence in the decoder module (8), by following an inverse schema. In the implemented example, one of every two macroblocks comprises a modified block (DC coefficient) while still respecting the modification frequencies for the six blocks of a macroblock.

The analysis system (121) then writes the value of the substituted coefficient of the modified I-VOP plane in the buffer (123). The analysis system continues its analysis until the end of the incoming MPEG-4 flow.

The new modified MPEG-4 flow is then recorded in the output buffer (122) to be broadcast on the broadcast network (4) via the link (5). The substituted DC coefficients of the modified I-VOP planes of the incoming MPEG-4 flow (101) are stored in memory in the buffer (123) of the portal (12).

During this time and in a completely unsynchronized manner, the modified MPEG-4 output flow originating from the output buffer (122) of the portal (12) is broadcast via the broad-band network (4) to one or more decoder modules (8).

Each authorized decoder module (8) that wants to record this thereby modified MPEG-4 flow can then read this MPEG-4 flow and record it on its hard disk (85). This recording initiative is left to the decoder module (8) under the control of the portal (12). In order to implement this, the analysis system (121) had written at the beginning of the MPEG-4 flow an information unit of supplementary data which specified the destination addresses of this modified MPEG-4 flow. The destinations can thus be a single addressee/user by himself, a group of or all of the decoders modules (8) connected to the network (4).

The phase described above corresponds to the first phase of preparation of the MPEG-4 flow by the portal (12), to its transmission via the broad-band network (4) and to its recording in a decoder module (8). This decoder can then display this MPEG-4 flow recorded on its hard disk (85). In order to implement this, the synthesis system (87) of the decoder module (8) will read the MPEG-4 file from its hard disk (85) and will send it to a conventional MPEG-4 reader (81). If no complementary data is received by the synthesis system (87), then the MPEG-4 flow which reaches the reader (81) is processed and displayed as it is, which causes a major distortion of the display on the visualization screen (6). In fact, the modified I-VOP planes which are processed by the synthesis system (87) do not correspond to the I-VOP planes which are necessary for a correct visualization since certain DC correlation coefficients were substituted by random coefficients. On the other hand, since the recorded flow is clearly an MPEG-4 type flow, the reader (81) does not recognize any difference and displays the information on the output screen (6) which appears as an MPEG-4 data flow but totally incoherent for the human who watches the screen (6). Any copy of the MPEG-4 flow originating from the hard disk (85) of the decoder module (8) will produce the same visual effect upon its reconstitution by any MPEG-4 reader; any use of this copy which would be ill intentioned would thus be doomed to failure.

When the user of the decoder module (8) wants to truly visualize on screen (6) the audiovisual program recorded on hard disk (85), the user sends a request to the synthesis system (87) with a remote control as with a VCR or DVD player having a menu on a television screen. The synthesis system (87) then sends a request to the hard disk (85) and begins to analyze the modified MPEG-4 flow originating from the hard disk (85) via the reading buffer (83). The synthesis system (87) then establishes a link with the portal (12) via the telecommunication network (10) which is a DSL link in our example. Once this link has been established and during the entire duration of the visualization of the film or audiovisual program, the synthesis system (87) draws out from the buffer memory (123) of the server (12) the substituted correlation coefficients and the data corresponding to the modified I-VOP planes of the flow recorded on the hard disk (85). These correlation coefficients and these position data originate from the synthesis system (87) via the input buffer memory (86) and are stored temporarily in the volatile memory (88) of the synthesis system (87). From the modified MPEG-4 flow which arrives via the buffer (83) and from the correlation coefficients and the associated data which come from the buffer (86) in the memory (88), the synthesis system (87) reconstitutes in inverse manner of the previously described analysis process the I-VOP planes modified by the real I-VOP planes, and sends the new MPEG-4 flow reconstituted in this manner to the reader (81) to be correctly displayed on the screen (6). Upon their use, the correlation coefficients to be substituted and the associated date of these I-VOP planes are erased from the volatile memory (88).

In the implemented example, before the portal (12) authorizes transmission of the I-VOP planes and associated data from its buffer (123), the portal (12) must verify that the user of the decoder module (8) is clearly authorized to implement the transaction. In order to do this, the portal (12) reads the information contained on the smart card (82) of the decoder module (8) and verifies that this user is in fact authorized to watch this audiovisual program. It is only after this verification that the correlation coefficients and the associated data are sent from the buffer (123) to the decoder module (8) corresponding to this user via the network (10).

In the implemented example, the user also made a private copy of the audiovisual program. The synthesis system (87) therefore wrote in a part (84) of the hard disk (85) complementary data as well as the number of the smart card (82) and the information unit "private copy" as data associated with this audiovisual program. Upon the next private reading of this audiovisual program, the synthesis system (87) will analyze these associated data and thereby inform the portal (12) that the user of the decoder module (8) is reading the private copy. If this function is authorized for this decoder module/user (8) by the portal (12), the correlation coefficients and associated data will then by sent by the portal (12) to the buffer (86) as described above. In the contrary case, the correlation coefficients and the associated data will not be transmitted and the user of the decoder module (8) will not be able to watch the reconstituted MPEG-4 flow.

We will now describe in detail the different steps for the second user of decoder module (8).

In this second case, the broadcast network (4) is a satellite network and the telecommunication network (10) is a cellular telephony system of GSM type narrow pass band.

In a manner identical to that described above, the user of the decoder module (8) receives the MPEG-4 flow and the complementary data from the portal (12).

In contrast, in the implemented example, instead of modifying every I-VOP plane, the analysis system (121) only takes one I-VOP plane out of n in which n is a random number comprised between 1 and 12, and takes into account the P-VOP planes. Thus, prior to sending the MPEG-4 from the output buffer (122), the analysis system (121) will read the incoming MPEG-4 flow (101) and after drawing the random number n, the synthesis system modifies the correlation coefficients at the nth I-VOP plane of the MPEG-4 flow. After each I-VOP plane modified in this manner, the analysis system (121) will perform a new drawing of a random number n. Each random number used in this manner is recorded in the buffer (123) of the portal (12). For the P-VOP planes, the analysis system (121) takes into account one P-VOP plane out of m in which m is a random number comprised between 1 and 5, in a frame for which the I-VOP plane was not modified.

The analysis system (121) of the portal (12) reads the incoming MPEG-4 flow (101) and whenever it detects an nth I-VOP plane or an mth P-VOP plane, it breaks them down into macroblocks (thus into slices), then into blocks. This analysis allows it to recognize the DC coefficients in the code and to substitute certain among them with random values in order to render the planes (and by consequence the sequence) unreadable from the human vision point of view. The true values of the DC coefficients will be stored in the output buffer (123) which will subsequently enable the reconstitution of the original sequence in the decoder module (8), by following the reverse schema.

Moreover, in this second implemented example, not all of the DC coefficients of this nth I-VOP plane will be modified.

Only one macroblock out of two comprises a modified block (DC coefficient) while respecting the equality of the modification frequencies for the six blocks of a macroblock. Moreover, the substitution of each DC coefficient is performed by a DC coefficient calculated in a random manner, but its value is compared to the value of the DC coefficient to be substituted in a manner such as to verify its deviation. If the deviation is too small, another random number is calculated so as to increase the deviation between the coefficient to be substituted and the substitution coefficient.

The same is true for the P-VOP planes.

For the reconstitution of the MPEG-4 flow, the decoder module (8) reads the buffers (86) and (87) and decodes the data elements of the binary train in accordance with the defined syntax.

When it reads the binary train, the decoder identifies the beginning of a coded plane and then the type of plane. It decodes successively each macroblock of the plane. The macroblock type and the movement vectors are used to construct a prediction of the current macroblock based on the prior and future reference planes which were stored in the decoder. The data of the coefficients are decoded and dequantified. Each 8×8 block of coefficient data is transformed by an inverse DCT. The result is added to the prediction signal with a defined dynamic. Before sending the MPEG-4 flow to the reader (81), the synthesis system (87) replaces the DC coefficients of the I-VOP and P-VOP planes that were substituted with those of the flow stemming from the buffer (86).

Upon reconstitution of the MPEG-4 flow by the synthesis system (87) of the decoder module (8), the reading of these random numbers and substituted correlation coefficients from the output buffer (123) of the portal (12) and the reading of the MPEG-4 flow modified in this manner from the hard disk (85) of the decoder module (8) enable the synthesis system (87) to reconstitute the I-VOP and P-VOP planes and to send all of this to the reader (81).

The plane is reconstructed by the reader (81) when all of the macroblocks have been processed. If it is dealing with an I-VOP or a P-VOP plane, it constitutes a reference plane for the subsequent planes and it is stored in place of the old reference plane. In the implemented example for this user, it was found that the second flow demanded a pass band smaller than one per thousand of the pass band required for transmitting the high-quality MPEG-4 flow, i.e., less than one kilobit per second for the second flow compared to one megabit per second for the first MPEG-4 flow.

We will now describe in detail the different steps for the third user.

The portal (121) selected the MPEG flow (101) that it must send to the decoder module/user (8) to be watched on television screen (6) on a delayed basis. This user is linked to a digital cable broadcast network (4) with video on demand (VOD) available, the network (10) is thus identical to the network (4). The analysis system (121) of the portal (12) will thus read the incoming MPEG-4 flow (101) and whenever it detects an I-VOP plane, it searches for the first P-VOP plane that follows this I-VOP plane in order to replace it with a random P-VOP plane that it itself calculated. The new modified MPET-4 flow is then recorded in the output buffer (122) in order to be broadcast on the broadcast network (4) via the link (5). The P-VOP planes taken from the incoming MPEG-4 flow (101) are stored in the memory of the buffer (123) of the portal (12). In the implemented example, rather than substitute each P-VOP plane that follows an I-VOP plane, the analysis system (12) only takes one I-VOP plane out of n in which n is a random number comprised between 1 and 7. When the analysis system (121) writes the substituted P-VOP plane in the buffer (123), it also writes the number of the I-VOP plane which precedes this substituted P-VOP plane. The analysis system (121) continues its analysis until the end of the incoming MPEG-4 flow.

During this time and in a completely unsynchronized manner, the modified MPEG-4 outgoing flow originating from the output buffer (122) of the portal (12) is broadcast via the broad-band network (4) to one or more decoder modules/users (8).

Each decoder module (8) that wants to record this MPEG-4 flow modified in this manner can then read this MPEG-4 flow and record it on its hard disk (85). This recording initiative is left to the decoder module (8) under the control of the portal (12). In order to eliminate this, the analysis system (121) wrote at the beginning of the MPEG flow an information unit of supplementary data that specified the destinations of this modified MPEG flow. The destinations can thus be one sole and particular addressee, a group of addressees or the totality of the decoders modules (8) linked to the network (4).

The phase described above corresponds to the first preparation phase of the MPEG flow by the portal (12), to its transmission via the broad-band network (4) and to its recording in a decoder module (8). This decoder can then display this MPEG flow recorded on its hard disk. In order to do this, the synthesis system (87) of the decoder module (8) will read the MPEG file from its hard disk (85) and then send it to a conventional MPEG reader (81). If no complementary data are received by the synthesis system (87), the MPEG flow that is received by the reader (81) is processed and displayed as it is, which creates a major distortion of the display on the visualization screen (6). In effect, the substituted P-VOP planes which are processed by the synthesis system (87) do not correspond to the P-VOP planes which are necessary for a correct visualization since these true P-VOP planes were substituted by random P-VOP planes. In contrast, since the recorded flow is clearly a flow of MPEG type, the standard reader (81) does not recognize any difference and displays the information on the output screen (6) which appears by contrast completely incoherent to the human watching the screen (6). All copies of the MPEG flow originating from the hard disk (85) of the decoder module (8) will produce the same visual effect upon their restitution by an MPEG reader. Any use of this copy which would be ill intentioned is thus doomed to failure.

When the user of the decoder module (8) wants to display on screen (6) the audiovisual program recorded on hard disk (85), the user sends a request to the synthesis system (87) with a remote control in the same manner as if dealing with a VCR or a DVD player presenting a menu on a television screen. The synthesis system (87) then sends a request to the hard disk (85) and begins to analyze the modified MPEG flow originating from the hard disk (85) via the reading buffer (83). The synthesis system (87) then establishes a link with the portal (12) via the telecommunication network (10) which in our example is also the cable network but which could have been a conventional telephone network or a DSL link.

Once this link has been established and during the entire duration of the display of the film or audiovisual program, the synthesis system (87) draws out from the buffer memory (123) of the server (12) the substituted P-VOP planes and the data corresponding to the positions of these P-VOP planes in relation to the I-VOP planes of the flow recorded on the hard disk (85). The P-VOP planes and these position data originate from the synthesis system (87) via the input buffer memory (86) and are stored temporarily in the volatile memory (88) of the synthesis system (87). From the modified MPEG flow which originates via the buffer (83) and from the P-VOP planes and the associated date which originate via the buffer (86) in the memory (88), the synthesis system (87) reconstitutes in reverse manner to the previously described analysis process the substituted P-VOP planes by the real P-VOP planes and sends the new MPEG flow reconstituted in this manner to the reader (81) to be displayed on the screen (6). Upon their use, the P-VOP planes to be substituted and the data associated with these P-VOP planes are erased from the volatile memory (88).

In the implemented example, before the portal (12) authorizes sending the P images and the associated data from its buffer (123), the portal (12) had verified that the user of the decoder module (8) was indeed authorized to do so. In order to perform this step, the portal (12) reads the information contained on the smart card (82) of the decoder module (8) and/or the serial number of the decoder module (8) and verifies that this user is indeed authorized to watch this audiovisual program. It was not until after verification that the P-VOP planes and the associated data were sent from the buffer (123) to the decoder module (8) corresponding to this user.

In the implemented user, the user had also made a private copy of his audiovisual program. The synthesis system (87) therefore wrote in a part (84) of the hard disk (85) complementary data as well as the number of the smart card (82) and/or the serial number of the decoder module (8) and the information tag "private copy" as data associated with this audiovisual program. Upon the next reading of this audiovisual program, the synthesis system (87) will analyze these associated data and will thus inform the portal (12) that the user of the decoder module (8) is implementing a reading of the private copy. If this function is authorized by the portal (12), the P-VOP planes and the associated data will then be sent via the portal (12) to the buffer (86) as described above. In the contrary case, the data will not be transmitted and the user of the decoder module (8) will not be allowed to watch the reconstituted MPEG flow.

In one particular case of this implemented example, the broadcast network (4) is a satellite network and the telecommunication network (10) is an airwaves system of the local radio loop (LRL) type.

In a manner identical to the description above, the user of the decoder module (8) will receive the MPEG flow and the complementary data from the portal (12). In contrast, prior to sending the MPEG flow from the output buffer (122), the analysis system (121) will read the incoming MPEG flow (101) and after drawing a random number n comprised between 1 and 4, the synthesis system permutes the nth P-VOP plane which follows each I-VOP plane of the MPEG flow with the first B-VOP plane which follows this P-VOP plane. Each random number used in this manner is recorded in the buffer (123) of the portal (12).

Upon reconstitution of the MPEG flow by the synthesis system (87) of the decoder module (8), the reading of these random numbers from the portal (12) and the reading of the MPEG flow modified in this manner from the hard disk (85) of the decoder module (8) enables the synthesis system (87) to restore the B-VOP and P-VOP planes in good order and to send the entirety to the reader (81).

We will now discuss in detail the different steps for the fourth implementation represented by FIG. 3.

In this implementation, the MPEG-4 flow is processed by the analysis system (12) in the same manner as the MPEG-4 flow of the second implementation.

However, the first modified MPEG-4 flow is written and recorded on a physical support (20) of the CD type from the output buffer memory of the analysis system (12).

The second flow is stored in memory in the buffer (123) and is also moreover recorded on a physical support (10 bis) of credit card format constituted by a smart card and a flash memory. This card (10 bis) will be read by the card reader (82) of the device (80). The device (80) is a portable and mobile autonomous system. In the implementation, the device (80) comprises the synthesis system (87), the standard MPEG-4 reader (81), the two buffer memories (86) and (83) as well as the disk reader (85).

The device (80) moreover comprises an integrated screen (6 bis) of the flat screen type which allows the user to watch directly his audiovisual programs on his autonomous device (80).

In order to visualize an audiovisual program of the MPEG-4 type, the user of the device (80) introduces in his disk reader (85) a disk (20 bis) of the type (20) identical to that recorded by the analysis system (12). This disk (20 bis) thus contains an MPEG-4 flow of the type of the first flow, i.e., with the DC coefficients of certain I-VOP and/or P-VOP planes substituted.

The user of the device (80) can thus visualize this MPEG-4 flow on his screen (6 bis) integrated in his device. However, because of the substitution of the DC coefficients, the MPEG-4 flow will not be correct from the visual point of view. In order to render this flow correct visually, the user introduces into the smart card reader (82) the memory card (10 bis) containing the second flow with the DC coefficients. The synthesis system then reconstitutes the correct MPEG-4 flow from the first flow originating from the disk (20 bis) and the second flow originating from the card (10 bis) connected to the reader (82).

In one particular setup, the smart card (10 bis) also contains the applications and the algorithms which will be executed by the synthesis system (87).

In another particular setup, the smart card (10 bis) contains the data and the DC coefficients of multiple second flows for the reconstitution of multiple MPEG-4 flows.

In one particular setup, the device (80) comprises a cellular link to a GSM network (10).

The invention claimed is:

1. A method for distributing video sequences according to a nominal flow format that describes a multiplicity of audiovisual scenes, each scene including a multiplicity of hierarchized audiovisual objects and a descriptor of the hierarchy and of spatial and temporal relationships among the objects, each video object comprising at least one complete intra-video object plane (I-VOP), comprising:
   analyzing a flow of video sequences;
   generating a first modified flow having the format of a nominal flow and a second flow of any format comprising digital information required for reconstruction of modified planes, based on the analysis of the flow of video sequences;
   separately transmitting the two flows generated from a server to destination equipment; and
   calculating on the destination equipment a synthesis of a flow of the nominal format as a function of the first and second flows.

2. The method according to claim 1, wherein each video object comprises at least one N-VOP plane, data representing the plane being calculated as a function of differences between the N-VOP plane and at least one other plane.

3. The method according to claim 2, wherein the first flow has modified N-VOP planes.

4. The method according to claim 2, wherein the data of at least one N-VOP plane are calculated by movement compensation from the N-VOP plane in relation to a preceding N-VOP or I-VOP plane such that the N-VOP plane is a P-VOP plane (predicted).

5. The method according to claim 2, wherein data of at least one N-VOP plane are calculated by movement compensation from the N-VOP plane in relation to preceding and following P-VOP or I-VOP planes such that the N-VOP plane is a B-VOP plane (bidirectional).

6. The method according to claim 1, wherein the nominal flow format is defined by the MPEG-4 standard.

7. The method according to claim 4 or 5, wherein the first flow has modified P-VOP planes.

8. The method according to claim 5, wherein the first flow has modified B-VOP planes.

9. The method according to claim 4 or 5, wherein the I-VOP plane is broken into blocks and macroblocks each dependent on each other by correlation coefficients, the first modified flow having I-VOP planes modified by substitution of selected correlation coefficients by coefficients of the same nature, but random, and the second flow comprises substituted correlation coefficients and the digital information needed to enable the reconstruction of the modified planes.

10. The method according to claim 1, wherein analyzing determines the correlation coefficients to be modified as a function of a desired size for the second flow and a desired degradation for the first modified flow.

11. The method according to claim 9, wherein at least one P-VOP plane is modified in the same manner as the I-VOP planes.

12. The method according to claim 9, wherein analyzing determines the I-VOP, P-VOP and B-VOP planes to be modified as a function of a desired size for the second flow and a level of degradation desired for the first modified flow.

13. The method according to claim 9, wherein transmission of the first flow is implemented via a physically distributed material support.

14. The method according to claim 1, wherein transmission of the first flow is implemented via a broad-band network or DAB.

15. The method according to claim 1, wherein transmission of the second flow is implemented via a switched telephonic network (analog or digital PSTN) or via a DSL type network (Digital Subscriber Line) or via an LRL network (local radio loop) or via a mobile telephonic network using GSM, GPRS or UMTS standards.

16. The method according to claim 1, wherein transmission of the second flow is implemented via a physically distributed material support.

17. The method according to claim 1, wherein transmission of the second flow is implemented via a broad-band network of the same type as the network used for the first flow.

18. The method according to claim 1, wherein transmission of the second flow is implemented via the same broad-band network as used for the first flow.

19. The method according to claim 1, wherein transmission of at least one of the two flows is encrypted.

20. The method according to claim 1, wherein at least one of the two flows is watermarked.

21. The method according to claim 1, wherein the two generated flows may be sent to a single equipment unit or a group of equipment units.

22. The method according to claim 1, wherein reconstruction and/or visualization is contingent on a transaction.

23. The method according to claim 1, wherein reconstruction can be authorized by a consultation of a private copy requested by a user.

24. Apparatus for creating a video flow according to the method of claim 1, comprising at least one multimedia server containing original video sequences and a device for analyzing the video flow originating from the server for generating the first and second flows.

25. The apparatus according to claim 24, further comprising a memory for recording a "private copy" marker indicating for each sequence rights of each user selected from the group consisting of a private copy that can be watched an unlimited number of times, a private copy that can be watched a limited number of times with specification of that number, and private copying prohibited.

26. The apparatus according to claim 24, further comprising a standard flow decoder, at least one recording interface for storing contents of the first flow and at least one display interface, and means for recomposing the original flow from the first and second flows.

27. The apparatus according to claim 26, wherein the recomposing means is software on the server.

28. The apparatus according to claim 26, wherein the recomposing means is software installed on a smart card.

29. The apparatus according to claim 26, wherein the recomposing means is an electronic device.

30. The apparatus according to claim 28, wherein the recomposing means uses a resource specific to the smart card to prevent copying of temporary information.

31. The apparatus according to claim 26, wherein the recording interface also stores a "private copy" marker in relation to the first flow indicating for this sequence a user's rights selected from the group consisting of a private copy that can be watched an unlimited number of times, a private copy that can be watched a limited number of times with indication of that number, and private copying prohibited.

32. The apparatus according to claim 26, further comprising a smart card reader enabling identification of a user when the user wants to watch an audiovisual program.

33. Apparatus for exploiting a video flow according to the method of claim 1, comprising a computer which is part of a communication interface for receiving a video flow originating from a communication network or a physical support reader, and equipped with at least one recorder for storing the first flow, and a decoder comprising a display interface, communication means with the computer for receiving the first flow transmitted by the computer and communication means for receiving the second flow recomposing means for the original flow from the first and second flows.

34. The apparatus according to claim 33, wherein the recomposing means is software installed only on the decoder.

35. The apparatus according to claim 33, wherein the recomposing means is an electronic device installed only on the decoder.

36. A system for transmitting a video flow according to the method of claim 1, comprising an equipment unit for production of a video flow, at least one equipment unit for exploitation of a video flow and at least one communication network between the production equipment unit and the exploitation equipment unit(s).

* * * * *